US010764022B2

(12) United States Patent
Park et al.

(10) Patent No.: US 10,764,022 B2
(45) Date of Patent: Sep. 1, 2020

(54) METHOD FOR TRANSMITTING AND RECEIVING ACKNOWLEDGEMENT INFORMATION IN WIRELESS LAN SYSTEM AND DEVICE FOR SAME

(71) Applicant: LG ELECTRONICS INC., Seoul (KR)

(72) Inventors: Sungjin Park, Seoul (KR); Jinmin Kim, Seoul (KR); Sunwoong Yun, Seoul (KR); Jinsoo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/328,703

(22) PCT Filed: Oct. 1, 2018

(86) PCT No.: PCT/KR2018/011630
§ 371 (c)(1),
(2) Date: Feb. 26, 2019

(87) PCT Pub. No.: WO2019/066612
PCT Pub. Date: Apr. 4, 2019

(65) Prior Publication Data
US 2019/0238303 A1 Aug. 1, 2019

Related U.S. Application Data

(60) Provisional application No. 62/565,118, filed on Sep. 29, 2017, provisional application No. 62/575,533, (Continued)

(51) Int. Cl.
*H04L 5/14* (2006.01)
*H04W 84/12* (2009.01)
(Continued)

(52) U.S. Cl.
CPC .............. *H04L 5/14* (2013.01); *H04L 1/1861* (2013.01); *H04W 72/04* (2013.01); *H04W 72/12* (2013.01); *H04W 84/12* (2013.01)

(58) Field of Classification Search
None
See application file for complete search history.

(56) References Cited

U.S. PATENT DOCUMENTS 9,531,520 B2   12/2016  Kwon et al.
9,814,058 B2 * 11/2017  Jiang ................. H04W 72/1205
(Continued)

FOREIGN PATENT DOCUMENTS

WO      2016105128           6/2016
WO      WO-2016105128 A1 *   6/2016  ........... H04L 1/1671
WO      WO-2017062062 A1 *   4/2017  ........... H04L 5/1469

OTHER PUBLICATIONS

Carlos Cordeiro etc., 'Scheduling for mmWave Distribution Networks', IEEE 802.11-17/1323r2, Sep. 13, 2017 See slide 9,14,20 page. (Year: 2017).*
Djordje Tujkovic etc., 'Features for mmW Distribution Network Use Case', IEEE 802.11-17/1321r0, Sep. 13, 2017 See slide 6,7,22 page. (Year: 2017).*
Tujkovic et al., "Features for mmW Distribution Network Use Case", doc.: IEEE 802.11-17/1321r0, Sep. 2017, 22 pages.
(Continued)

*Primary Examiner* — Robert M Morlan
(74) *Attorney, Agent, or Firm* — Lee, Hong, Degerman, Kang & Waimey PC

(57) ABSTRACT

The present specification discloses a method for transmitting and receiving acknowledgement (ACK) information in a wireless local area network (WLAN) system and a device for the same. More specifically, the present specification describes a method in which a station device scheduled according to a time division duplex (TDD) scheduling scheme transmits and receives ACK information based on TDD scheduling information and a device for the same.

15 Claims, 21 Drawing Sheets

Related U.S. Application Data filed on Oct. 23, 2017, provisional application No. 62/581,048, filed on Nov. 3, 2017.

(51) Int. Cl.
*H04W 72/12* (2009.01)
*H04W 72/04* (2009.01)
*H04L 1/18* (2006.01)

(56) References Cited

U.S. PATENT DOCUMENTS

| | | |
|---|---|---|
| 2011/0075642 A1 | 3/2011 | Cordeiro et al. |
| 2014/0233478 A1* | 8/2014 | Wentink .............. H04L 5/0055 370/329 |
| 2015/0063233 A1 | 3/2015 | Choi et al. |
| 2017/0187439 A1 | 6/2017 | Park et al. |
| 2019/0045520 A1* | 2/2019 | Venkatachalam Jayaraman ......... H04L 5/1469 |
| 2019/0068255 A1* | 2/2019 | Bolotin .............. H04B 7/0452 |

OTHER PUBLICATIONS

Cordeiro et al., "Scheduling for mmWave Distribution Networks", doc.: IEEE 802.11-17/1323r2, Sep. 2017, 24 pages.

European Patent Office Application Serial No. 18845429.2, Search Report dated Feb. 10, 2020, 11 pages.

Ghasempour et al., "IEEE 802.11ay: Next-generation 60 GHz Communication for 100 Gbps Wi-Fi", Sep. 2017, 11 pages.

The 802.11 Working Group of the LAN/MA Standards Committee of the IEEE Computer Society, IEEE P802.11-REVmdTM/D0.3, Sep. 2017 Draft Standard for Information technology—Telecommunications and information exchange between systems Local and metropolitan are networks—Specific requirements, Part 11: Wireless LAN Medium Access Control (MAC) and Physical Layer (PHY) Specifications, Paragraph 9.4.1.14, Sep. 2017, 4 pages.

The 802.11 Working Group of the LAN/MA Standards Committee of the IEEE Computer Society, IEEE P802.11-REVmdTM/D0.3, Sep. 2017 Draft Standard for Information technology—Telecommunications and information exchange between systems Local and metropolitan are networks—Specific requirements, Part 11: Wireless LAN Medium Access Control (MAC) and Physical Layer (PHY) Specifications, Paragraph 10.26, Sep. 2017, 30 pages.

* cited by examiner

FIG. 9

| CH 1 | L-STF | L-CE | L-Header | ay Header A | ay STF | ay CE | ay Header B | ay payload |
|---|---|---|---|---|---|---|---|---|
| | GF-STF | GF-CE | | | | | | |
| CH 2 | L-STF | L-CE | L-Header | ay Header A | | | | |

(L: Legacy, GF: Gap Filling, ay: 802.11ay)

FIG. 15

Consider an example where a DN sends the TDD Bitmap Schedule IE to 3 associated CNs

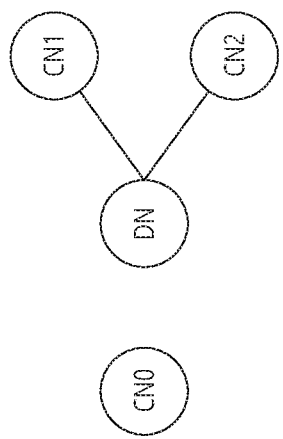

| | TDD SP1 (TX) DN→CN0 Simplex | TDD SP2 (TX) DN→CN1 Simplex | TDD SP3 (TX) DN→CN2 Simplex | TDD SP4 (RX) CN0→DN Simplex | TDD SP5 (RX) CN0→DN Simplex | TDD SP6 (RX) CN2→DN Simplex | TDD SP7 (TX for ACK) CNs→DN Simplex | TDD SP8 (TX for ACK) DN→CNs Simplex |
|---|---|---|---|---|---|---|---|---|
| Access type and Assignment | | | | | | | | |
| Bitmap in the IE from DN to CN0 | 10 | 00 | 00 | 01 | 01 | 00 | 11 | 10 |
| Bitmap in the IE from DN to CN1 | 00 | 10 | 00 | 00 | 00 | 00 | 11 | 10 |
| Bitmap in the IE from DN to CN2 | 00 | 00 | 10 | 00 | 00 | 01 | 11 | 10 |

METHOD FOR TRANSMITTING AND RECEIVING ACKNOWLEDGEMENT INFORMATION IN WIRELESS LAN SYSTEM AND DEVICE FOR SAME

CROSS-REFERENCE TO RELATED APPLICATIONS

This application is the National Stage filing under 35 U.S.C. 371 of International Application No. PCT/KR2018/011630, filed on Oct. 1, 2018, which claims the benefit of U.S. Provisional Application No. 62/565,118, filed on Sep. 29, 2017, 62/575,533, filed on Oct. 23, 2017, and 62/581,048, filed on Nov. 3, 2017, the contents of which are all hereby incorporated by reference herein in their entireties.

BACKGROUND OF THE INVENTION

Field of the Invention

The following description relates to a method for transmitting and receiving acknowledgement (ACK) information in a wireless local area network (WLAN) system and a device for the same.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY OF THE INVENTION

The present invention proposes a method in which time division duplex (TDD)-scheduled station devices according to a TDD scheduling scheme transmit and receive acknowledgement (ACK) information by and a device therefor.

One aspect of the present invention proposes a method in which a station (STA) transmits ACK information in a wireless local area network (WLAN) system, the method including: receiving TDD allocation information from an access point (AP) in one service period (SP), the TDD allocation information including information on all second time units included in the one SP when the one SP includes at least one first time unit and one first time unit includes at least one second time unit; and transmitting ACK information to the AP in at least one second time unit determined based on the TDD allocation information in the one SP.

Here, the TDD allocation information may indicate that the at least one second time unit is allocated for transmitting the ACK information.

More specifically, the TDD allocation information may include at least one successive two bits information, and each of the two bits information may comprise information on whether a related second time unit is allocated for transmitting the ACK information.

Here, when the number of first time units included in the one SP is Q and the number of second time units included in the one first time unit is M, the TDD allocation information may have a size of octets that satisfies the following equation.

$$\left\lceil \frac{Q \times M}{4} \right\rceil \quad \text{[Equation]}$$

Here, [A] may represent the smallest integer among integers equal to or greater than A.

A particular second time unit for the STA to transmit the ACK information may be allocated in the last interval of a particular first time unit including the particular second time unit.

The STA may receive a signal requesting transmission of the ACK information from the AP before transmission of the ACK information.

The one SP may be included in a data transfer interval (DTI).

Another aspect of the present invention proposes a method in which an AP receives ACK information from an STA in a WLAN system, the method including: transmitting TDD allocation information to the STA in one SP, the TDD allocation information including information on all second time units included in the one SP when the one SP includes at least one first time unit and one first time unit includes at least one second time unit; and receiving ACK information from the STA in at least one second time unit determined based on the TDD allocation information in the one SP.

Here, the TDD allocation information may indicate that the at least one second time unit is allocated for transmitting the ACK information.

More specifically, the TDD allocation information may include at least one successive two bits information, and each of the two bits information may comprise information on whether a related second time unit is allocated for transmitting the ACK information.

Here, when the number of first time units included in the one SP is Q and the number of second time units included in the one first time unit is M, the TDD allocation information may have a size of octets that satisfies the following equation.

$$\left\lceil \frac{Q \times M}{4} \right\rceil \quad \text{[Equation]}$$

Here, [A] may represent the smallest integer among integers equal to or greater than A.

A particular second time unit for the STA to transmit the ACK information may be allocated in the last interval of a particular first time unit including the particular second time unit.

The STA may receive a signal requesting transmission of the ACK information from the AP before transmission of the ACK information.

The one SP may be included in a DTI.

Still another aspect of the present invention proposes a station device that transmits ACK information in a WLAN system, the station device including: a transceiver configured to have at least one radio frequency (RF) chains and to transmit and receive a signal to and from another station device; and a processor configured to be connected to the transceiver and to process the signal transmitted to and received from the other station device, wherein the processor is configured to: receive TDD allocation information from the other station device in one SP, the TDD allocation information including information on all second time units included in the one SP when the one SP includes at least one first time unit and one first time unit includes at least one second time unit; and transmit ACK information to the other station device in at least one second time unit determined based on the TDD allocation information in the one SP.

Yet another aspect of the present invention proposes a station device that receives ACK information in a WLAN system, the station device including: a transceiver configured to have at least one RF chains and to transmit and receive a signal to and from another station device; and a processor configured to be connected to the transceiver and to process the signal transmitted to and received from the other station device, wherein the processor is configured to: transmit TDD allocation information to the other station device in one SP, the TDD allocation information including information on all second time units included in the one SP when the one SP includes at least one first time unit and one first time unit includes at least one second time unit; and receive ACK information from the other station device in at least one second time unit determined based on the TDD allocation information in the one SP.

The effects of the present invention will not be limited only to the effects described above. Accordingly, effects that have not been mentioned above or additional effects of the present application may become apparent to those having ordinary skill in the art from the description presented below.

Through the foregoing configuration, a station device supporting the 802.11ay system applicable to the present invention can transmit and receive ACK information in an allocated time interval.

Particularly, according to the foregoing configuration, unlike in the conventional Wi-Fi system, an AP (or DN) can dynamically set (or allocate) an interval for transmitting and receiving ACK information, and an STA (or CN) subordinate to the AP can transmit and receive ACK information in the time interval dynamically set (or allocated) by the AP (or DN).

The effects of the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

The appended drawings of this specification are presented to provide a further understanding of the present invention and are incorporated in and constitute a part of this application, illustrate embodiments of the invention and serve to explain the principle of the invention along with the description of the present invention.

FIG. 9 is a diagram showing a PPDU structure that can be applied to the present invention.

FIG. 15 schematically illustrates an operation according to the third signaling method of the present invention.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

Although diverse mobile communication systems applying the present invention may exist, a wireless LAN (WLAN) system will hereinafter be described in detail as an example of such mobile communication system.

1. Wireless LAN (WLAN) System

1-1. General Wireless LAN (WLAN) System

Figure 1:
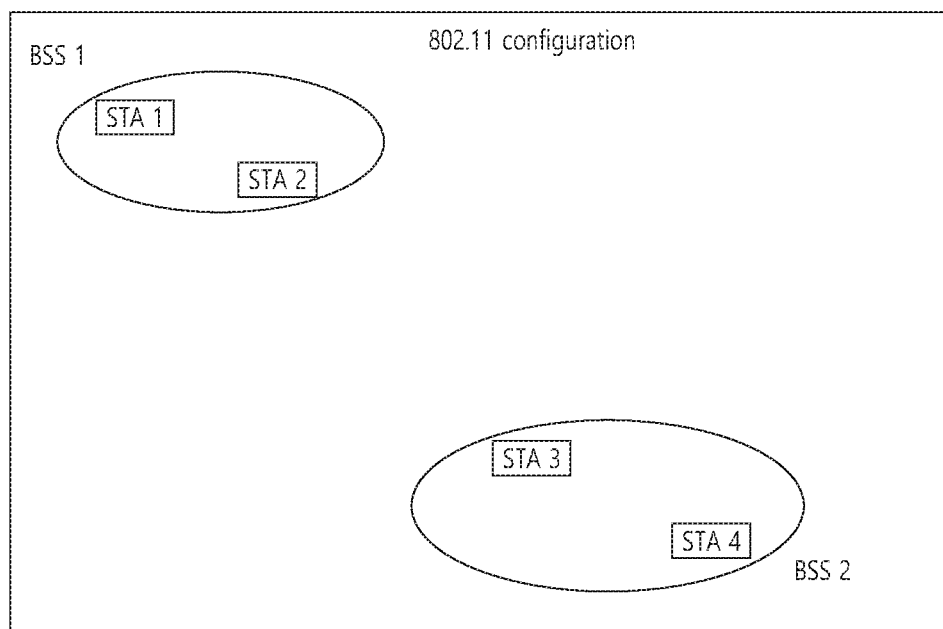
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes at least one Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
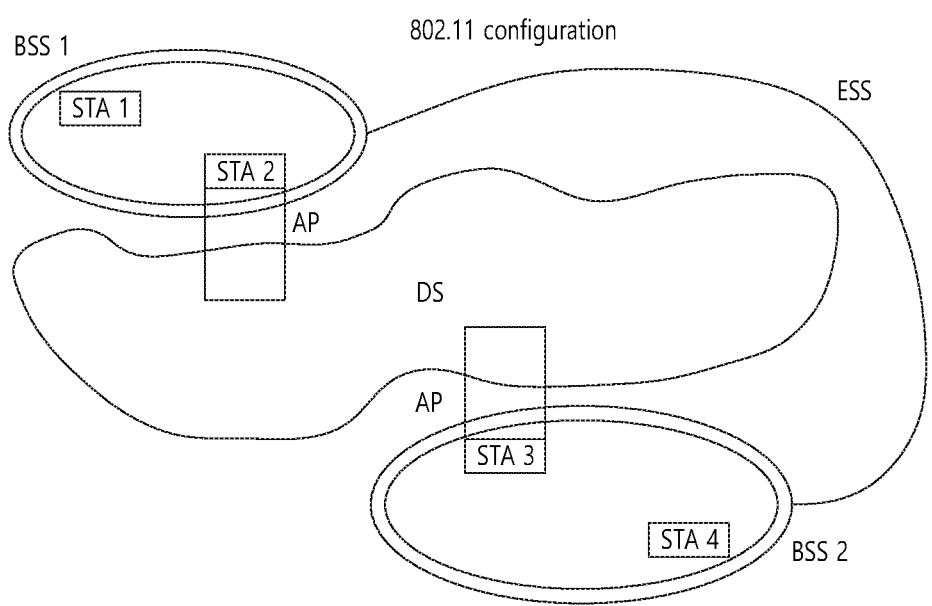
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes at least one STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS in the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2 Channel Bonding in a Wireless LAN (WLAN) System

Figure 3:
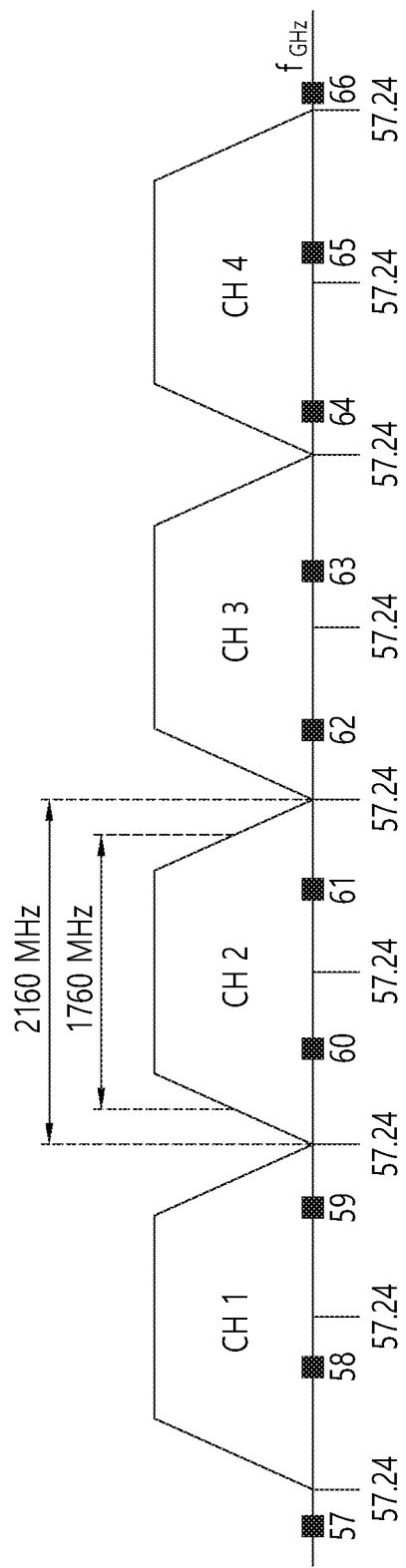
FIG. 3 is a diagram describing a channel in a 60 GHz band for describing a channel bonding operation according to an exemplary embodiment of the present invention.

FIG. 3 is a diagram describing a channel in a 60 GHz band for describing a channel bonding operation according to an exemplary embodiment of the present invention.

As shown in FIG. 3, 4 channels may be configured in a 60 GHz band, and a general channel bandwidth may be equal to 2.16 GHz. An ISM band (57 GHz~66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present invention will not be limited to only at least one specific channels.

Figure 4:
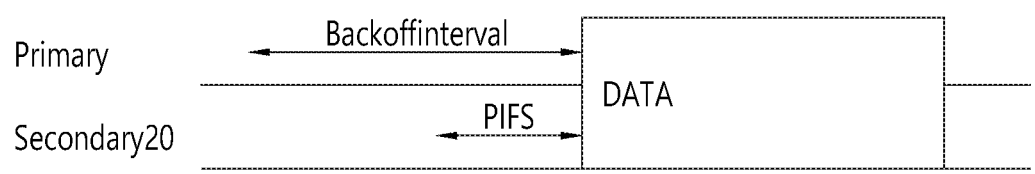
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present invention, a solution (or method) for performing scheduling-based access by having the AP transmit scheduling information to the STAs is proposed. Meanwhile, in another aspect of the present invention, a solution (or method) for performing contention-based channel access based on the above-described scheduling or independently from the above-described scheduling is proposed. Furthermore, in yet another aspect of the present invention, a method for performing communication through a spatial sharing technique based on beamforming is proposed.

1-3. Beacon Interval Configuration

Figure 5:
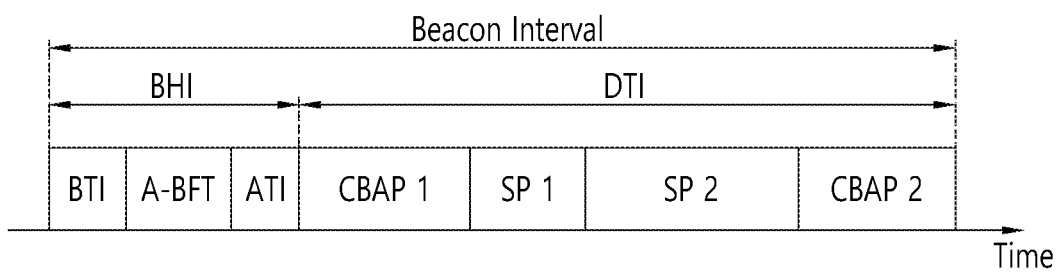
FIG. 5 is a diagram describing a configuration of a beacon interval.

FIG. 5 is a diagram describing a configuration of a beacon interval.

In an 11 ad-based DMG BSS system, the time of medium may be divided into beacon intervals. A lower level period in the beacon interval may be referred to as an access period. Each of the different access periods in one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, at least one Contention Based Access Periods (CBAPs) and at least one Service Periods (SPs) may be allocated (or assigned) to the DTI. Although FIG. 5 shows an example where 2 CBAPs and 2 SPs are allocated to the DCI, this is merely exemplary. And, therefore, the present invention is not necessarily required to be limited only to this.

Hereinafter, a physical layer configuration in a wireless LAN (WLAN) system, in which the present invention is to be applied, will be described in detail.

1-4. Physical Layer Configuration

It will be assumed that the wireless LAN (WLAN) system according to an exemplary embodiment of the present invention may provide 3 different modulations mode as shown below.

TABLE 1

| PHY | MCS | Note |
| --- | --- | --- |
| Control PHY | 0 | |
| Single carrier PHY (SC PHY) | 1 ... 12<br>25 ... 31 | (low power SC PHY) |
| OFDM PHY | 13 ... 24 | |

Such modulation modes may be used for satisfying different requirements (e.g., high throughput or stability). Depending upon the system, among the modulation modes presented above, only some of the modulation modes may be supported.

Figure 6:
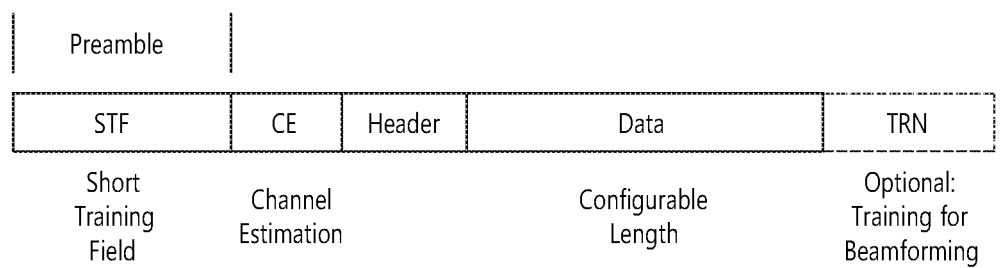
FIG. 6 is a diagram describing a physical configuration of a legacy radio frame.

FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
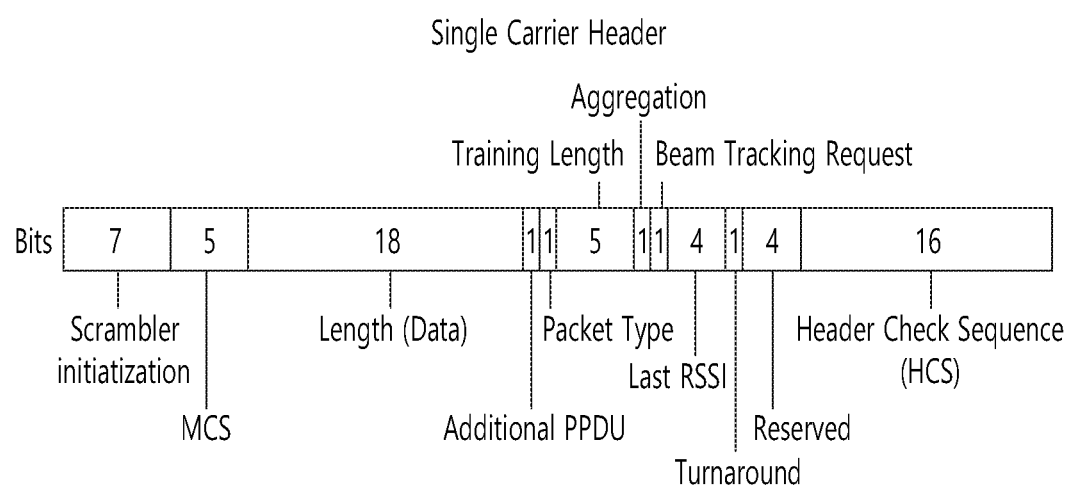
FIG. 7 and FIG. 8 are diagrams describing a configuration of a header field of the radio frame shown in FIG. 6.
Figure 8:
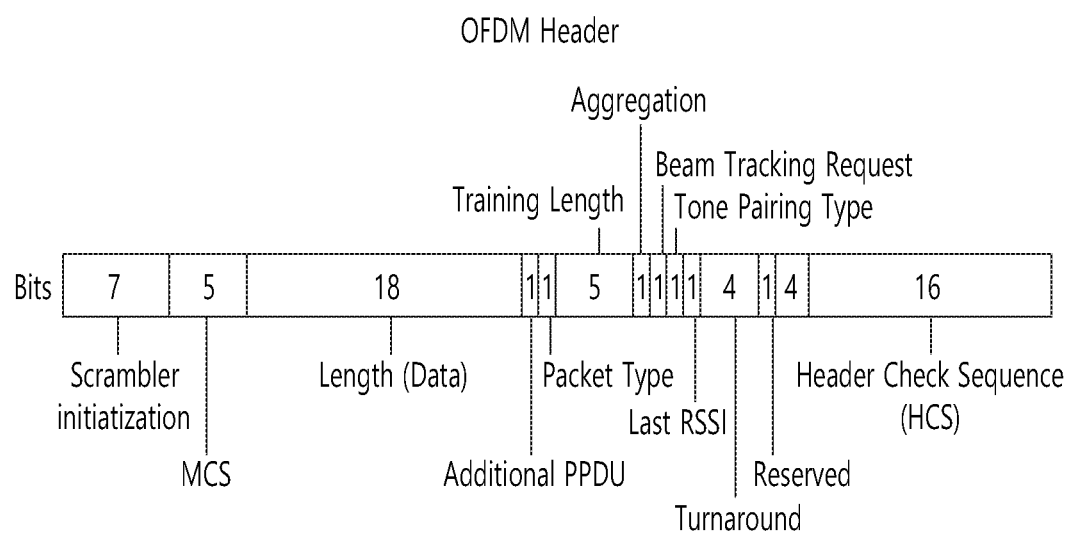

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11ay system considers for the first time the adoption of channel bonding the MIMO technique to the legacy 11 ad system. In order to implement channel boning and MIMO, the 11 ay system requires a new PPDU structure. In other words, when using the legacy 11 ad PPDU structure, there are limitations in supporting the legacy user equipment (UE) and implementing channel bonding and MIMO at the same time.

For this, a new field for the 11 ay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present invention. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel And, according to the exemplary embodiment of the present invention, it may be considered to perform the transmission (gap filling) of a new STF and CE field along with the legacy preamble at the same time through the 400 MHz band between each channel.

In this case, as shown in FIG. 9, the PPDU structure according to the present invention has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11 ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
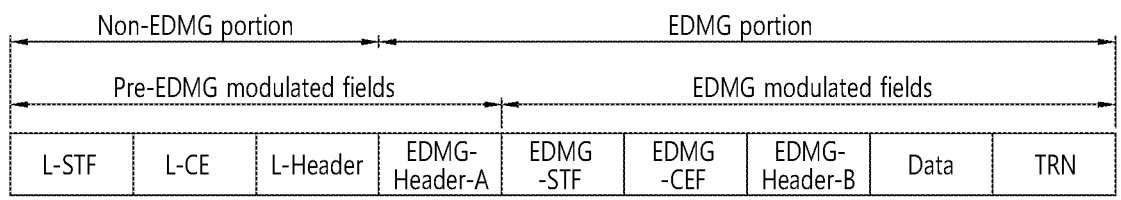
FIG. 10 is a diagram showing a simple PPDU structure that can be applied to the present invention.

FIG. 10 is a diagram showing a simple PPDU structure that can be applied to the present invention. When briefly summarizing the above-described PPDU format, the PPDU format may be illustrated as shown in FIG. 10.

As shown in FIG. 10, the PPDU format that is applicable to the 11 ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

The (legacy) preamble part of the PPDU may be used for packet detection, automatic gain control (AGC), frequency offset estimation, synchronization, indication of modulation (SC or OFDM), and channel estimation. A format of the preamble may be common to both OFDM packets and SC packets. Here, the preamble may include a short training field (STF) and a channel estimation (CE) field.

2. Embodiments to which the Present Invention is Applicable

Hereinafter, technical features proposed in the present invention will be described in detail based on the aforementioned technical idea.

More specifically, the 802.11ay system to which the present invention is applicable can supports time division duplex (TDD) scheduling for at least one STAs using a service period (SP) in a DTI, which is described in detail below.

Figure 11:
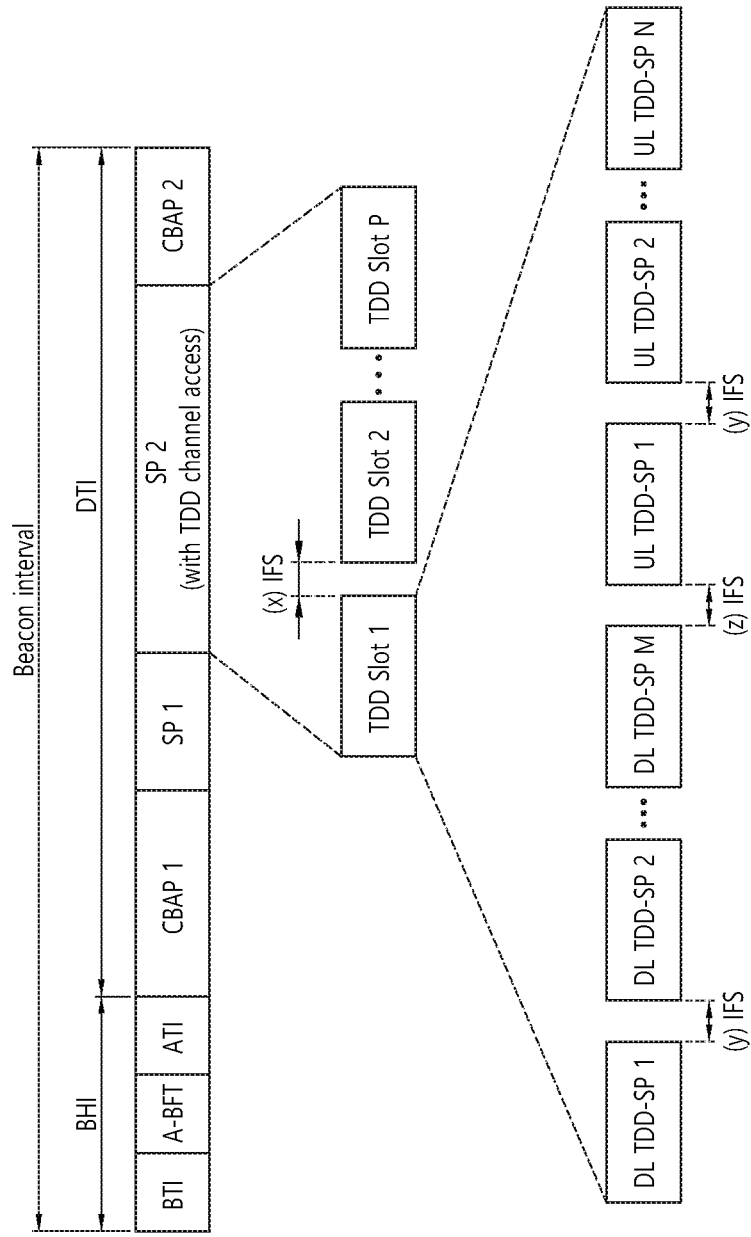
FIG. 11 schematically illustrates a TDD scheduling method according to an embodiment of the present invention.

FIG. 11 schematically illustrates a TDD scheduling method according to an embodiment of the present invention.

As illustrated in FIG. 11, an SP in a DTI may include at least one successive TDD slots, and each TDD slot may be configured to be spaced apart from an adjacent TDD slot by (x) interframe space (IFS).

Also, each TDD slot may include at least one DL TDD-SPs and at least one UL TDD-SPs, a time interval of (y) IFS may be configured between adjacent DL TDD-SPs or between UL TDD-SPs, and a time interval of (z) IFS may be configured between the last DL TDD-SP and the first UL TDD-SP.

Here, (x) IFS, (y) IFS, and (z) IFS indicate that various IFSs may be applied depending on x, y, and z, and these values may be one of various IFSs illustrated below.

Reduced interframe space (RIFS)
Short interframe space (SIFS)
Point coordination function (PCF) interframe space (PIFS)
Distributed coordination function (DCF) interframe space (DIFS)
Arbitration interframe space (AIFS)
Extended interframe space (EIFS)
Short beamforming interframe space (SBIFS)
Beam refinement protocol interframe space (BRPIFS)
Medium beamforming interframe space (MBIFS)
Long beamforming interframe space (LBIFS)

Here, only DL transmission is allowed in a DL TDD-SP, and only DL transmission is allowed in a UL TDD-SP.

The foregoing TDD scheduling method may be generalized as follows.

Figure 12:
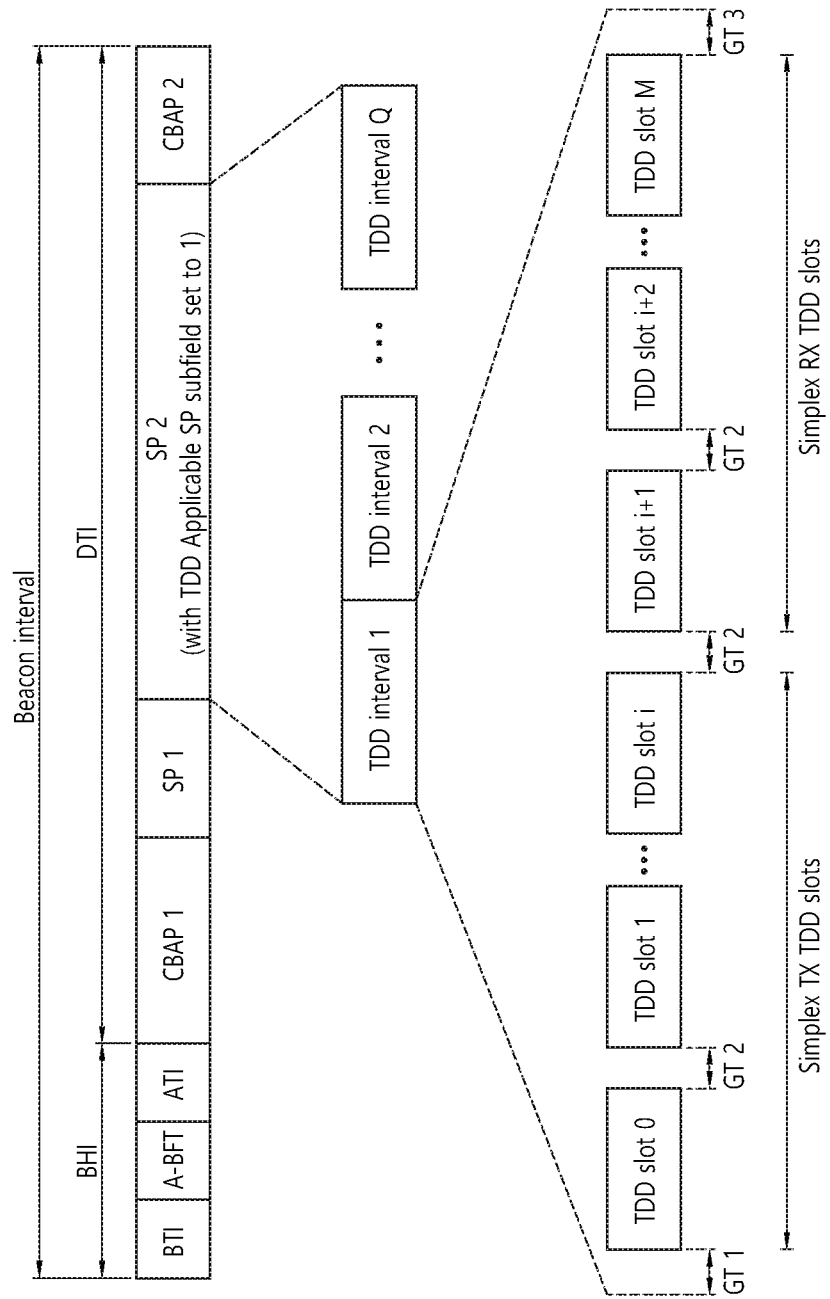
FIG. 12 schematically illustrates a TDD scheduling method according to another embodiment of the present invention.

FIG. 12 schematically illustrates a TDD scheduling method according to another embodiment of the present invention.

In FIG. 12, a TDD interval may correspond to a TDD slot in FIG. 11, a TDD slot(s) for simplex TX TDD slots may correspond to a DL TDD-SP in FIG. 11, and a TDD slot(s) for simplex RX TDD slots may correspond to a UL TDD-SP in FIG. 11.

In FIG. 12, guard time (GT) 1, GT 2, and GT 3 may be configured through separate signaling.

Hereinafter, to avoid confusion between the time units shown in FIGS. 11 and 12, a time unit corresponding to 'TDD slot' in FIG. 11 and 'TDD interval' in FIG. 12 is referred to as a first time unit, and a time unit corresponding to 'DL TDD-SP' and 'UL TDD-SP' in FIG. 11 and 'TDD slot(s) for simplex TX/RX TDD slots' in FIG. 12 is referred to as a second time unit.

The TDD scheduling method configured as above enables fast data transmission throughout the system, thereby increasing system performance.

In addition, an ACK transmission procedure for checking the validity of TDD-scheduled DL or UL transmission may be additionally defined to practically improve system performance.

Accordingly, the present invention specifically illustrates a method for transmitting and receiving an ACK between an STA and an AP in the TDD scheduling method.

First, a signaling method of the AP for supporting ACK transmission and reception in TDD scheduling will be described in detail below.

For SP allocation according to the TDD scheduling scheme in a DTI, the AP may signal that the TDD scheduling scheme (or TDD channel access) is used for the allocation of a particular SP using a particular subfield (e.g., an SP with TDD channel access or a TDD-applicable SP) of an extended schedule element (e.g., see Table 2 or Table 3).

TABLE 2

| Subfields | Allocation ID | Allocation Type | Pseudo-static | Truncatable | Extendable | PCP Active | LP SC Used | SP with TDD Channel Access | Reserved |
|---|---|---|---|---|---|---|---|---|---|
| Bits | 4 | 3 | 1 | 1 | 1 | 1 | 1 | 1 | 3 |

TABLE 3

| | B0 B3 | B4 B6 | B7 | B8 | B9 | B10 | B11 LP | B12 TDD | B13 B15 |
|---|---|---|---|---|---|---|---|---|---|
| | Allocation ID | Allocation Type | Pseudo-static | Truncatable | Extendable | PCP Active | SC Used | Applicable SP | Reserved |
| Bits: | 4 | 3 | 1 | 1 | 1 | 1 | 1 | 1 | 3 |

Further, the AP may notify the STA how one first time unit (e.g., a TDD slot in FIG. 11 or TDD interval in FIG. 12) is configured in an SP according to the TDD scheduling scheme through a TDD slot structure element.

Hereinafter, although specific signaling methods of the AP will be separately described with reference to embodiments, the configurations of the embodiments that are compatible as an extended example may be achieved in combination.

First Signaling Method

The AP may notify the STA of a TDD slot structure by transmitting a TDD slot structure IE format configured as in Table 4 to the STA.

TABLE 4

| Fields | Octets |
|---|---|
| Element ID | 1 |
| Length | 1 |
| Element ID Extension | 1 |
| TDD Slot Schedule Control | 3 |
| Allocation Block Duration | 2 |
| TDD Slot Schedule | M + N |

M denotes the number of DL TDD-SPs in FIG. 11 or the number of TDD slot(s) for simplex TX TDD slots in FIG. 12, and N denotes the number of UL TDD-SPs in FIG. 1 or the number of TDD slot(s) for simplex RX TDD slots in FIG. 12.

Here, a TDD Slot Schedule Control field in Table 4 is configured as in Table 5, and a TDD Slot Schedule field is configured as in Table 6. Here, the fields in Table 5 and Table 6 are configured based on the TDD scheduling scheme of FIG. 11, and the definitions of the fields may be adaptively interpreted according to the TDD scheduling scheme of FIG. 12.

TABLE 5

| Subfields | Bits | Definition |
|---|---|---|
| Number of DL TDD-SPs per TDD slot | 3 | Value denoted as M |
| Number of UL TDD-SPs per TDD slot | 3 | Value denoted as N |

TABLE 5-continued

| Subfields | Bits | Definition |
|---|---|---|
| IFS(Y) Duration | 4 | Duration of IFS Y in usec |
| IFS(X-Y) Duration | 2 | Difference between IFS X and Y in usec |
| IFS(Z-Y) Duration | 2 | Difference between IFS Z and Y in usec |
| Allocation ID | 4 | ID from SP allocation |
| Allocation Block Duration Validity | 1 | 0 = Indicates unlimited across consecutive BIs if adjacent allocations have TDD-SP = 1<br>1 = Indicate duration is same as the SP |
| ACK present | 1 | 0 = ACK indicates slot where no ACK transmission is performed<br>1 = ACK indicates slot where ACK transmission is performed |
| Reserved | 4 | |

TABLE 6

| Subfields | Bits | Definition |
|---|---|---|
| DL TDD-SP 1 Duration | 8 | Duration of TDD-SP 1 in usec |
| ... | ... | |
| DL TDD-SP M Duration | 8 | Duration of TDD-SP M in usec |
| UL TDD-SP 1 Duration | 8 | Duration of TDD-SP 1 in usec |
| ... | ... | |
| UL TDD-SP N Duraton | 8 | Duration of TDD-SP N in usec |
| ACK TDD-SP Duration | 8 | Duration of ACK TDD-SP in usec |

The AP may transmit a beacon message including the extended schedule element and the TDD slot structure element to the STA, thereby allocating an SP in a DTI according to the TDD scheduling scheme.

Second Signaling Method

The AP may allocate a DTI as an SP according to the TDD scheduling scheme, and if the structure of a TDD slot in the SP is determined, the AP may signal information about which time interval (e.g., a DL TDD-SP in FIG. 11, a TDD slot(s) for simplex TX TDD slots in FIG. 12, a UL TDD-SP in FIG. 11, or a TDD slot(s) for simplex RX TDD slots in FIG. 12) the AP allocates for STAs to the STA using a bitmap.

Here, the following elements may be used for the signaling.

More specifically, a particular SP (in FIG. 11) or a particular slot interval (in FIG. 12) may be allocated as a TX interval (i.e., an UL interval), an RX interval (i.e., a DL interval), or an ACK transmission interval through the following element.

For example, an ACK TDD SP (in FIG. 11) or an ACK slot (in FIG. 12) may be located at various positions in the SP. For example, the ACK TDD SP may be allocated the last interval after a DL TDD SP and a UL TDD SP.

In the following table, Q indicates the number of TDD slots in FIG. 11 or TDD intervals in FIG. 12, where M indicates the number of DL TDD-SPs in FIG. 11 or TDD slot(s) for simplex TX TDD slots in FIG. 12, and N indicates the number of UL TDD-SPs in FIG. 11 or TDD slot(s) for simplex RX TDD slots in FIG. 12.

TABLE 7

| | Element ID | Length | Element ID Extension | Bitmap Schedule Control | Bitmap and Access Type Schedule |
|---|---|---|---|---|---|
| OcTETs | 1 | 1 | 1 | 7 | $\left\lceil \frac{Q(M+N+1)}{4} \right\rceil$ |

Possible values for each pair of consecutive 2 bits:
00: not assigned;
01: assigned simplex TX;
10: assigned simplex RX;
11: assigned ACK To generalize the second signaling method, elements according to the second signaling method may be configured as shown in the following table. In this case, the size of a Bitmap and Access Type Schedule field may be determined based on X, which is the number of transmission intervals including a TX interval (i.e., a UL interval), an RX interval (i.e., a DL interval), and an ACK transmission interval. Here, as described above, Q may indicate the number of TDD slots in FIG. 11 or TDD intervals in FIG. 12.

TABLE 8

| | Element ID | Length | Element ID Extension | Bitmap Schedule Control | Bitmap and Access Type Schedule |
|---|---|---|---|---|---|
| OcTETs | 1 | 1 | 1 | 7 | $\left\lceil \frac{Q*X}{4} \right\rceil$ |

Possible values for each pair of consecutive 2 bits:
00: not assigned;
01: assigned simplex TX;
10: assigned simplex RX;
11: assigned ACK Accordingly, an ACK TDD SP (in FIG. 11) or an ACK slot (in FIG. 12) may be located at various positions in the SP. For example, the ACK TDD SP may be allocated the last interval after a DL TDD SP and a UL TDD SP.

Figure 13:
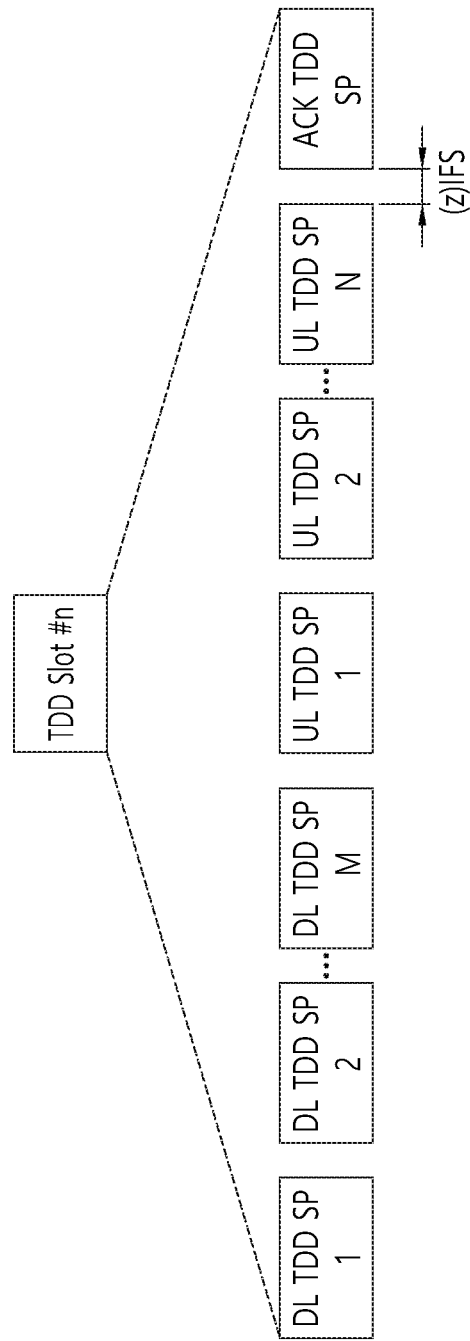
FIG. 13 schematically illustrates an example in which an ACK TDD SP is allocated after a DL TDD SP and a UL TDD SP according to an embodiment of the present invention.

FIG. 13 schematically illustrates an example in which an ACK TDD SP is allocated after a DL TDD SP and a UL TDD SP according to an embodiment of the present invention.

FIG. 13 illustrates a configuration based on the slot structure of FIG. 11. Based on the slot structure of FIG. 12, a DL TDD-SP, a UL TDD-SP, and an ACK TDD-SP may be replaced with a TX TDD slot, an RX TDD slot, and an ACK TDD slot, respectively.

Third Signaling Method

Figure 14:
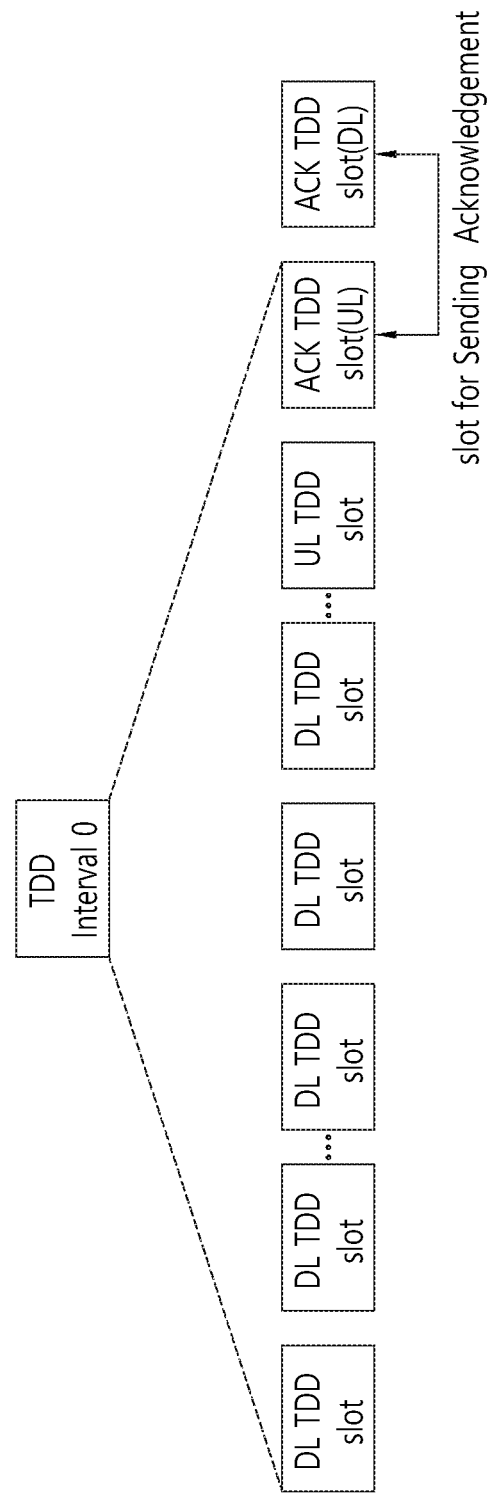
FIG. 14 schematically illustrates an example in which an ACK TDD SP (UL) and an ACK TDD SP (DL) are allocated after a DL TDD SP and a UL TDD SP according to an embodiment of the present invention.

FIG. 14 schematically illustrates an example in which an ACK TDD SP (UL) and an ACK TDD SP (DL) are allocated after a DL TDD SP and a UL TDD SP according to an embodiment of the present invention.

Unlike in the signaling method described above, a TDD slot for ACK transmission may be signaled, being divided into an ACK TDD slot for UL transmission and an ACK TDD slot for DL transmission.

Here, the AP may transmit elements configured as shown in the following table to the STA, thereby allocating a slot interval for the STA to transmit an ACK.

TABLE 9

| | Element ID | Length | Element ID Extension | Bitmap Schedule Control | Bitmap and Access Type Schedule |
|---|---|---|---|---|---|
| OcTETs | 1 | 1 | 1 | 7 | $\left\lceil \frac{Q*X}{4} \right\rceil$ |

Possible values for each pair of consecutive 2 bits:
00; not assigned;
01: assigned simplex TX;
10: assigned simplex RX or assigned RX for ACK;
11: assigned TX for ACK Here, a Bitmap and Access Type Schedule field may be determined based on X, which is the number of transmission intervals including an ACK transmission interval. Here, as described above, Q may indicate the number of TDD slots in FIG. 11 or TDD intervals in FIG. 12.

Accordingly, an ACK TDD SP (UL) or an ACK TDD SP (DL) may be located at various positions in an SP. For example, the ACK TDD SP may be allocated the last interval after a DL TDD SP and a UL TDD SP.

With this configuration, it is possible to allocate ACK transmission intervals for DL and UL transmissions in the same TDD interval, thus solving a problem due to long-delayed acknowledgment (ACK).

That is, during TDD-slots for ACK, a distribution node (DN, e.g., an AP) and a client node (CN, e.g., an STA) may transmit an ACK of a preceding DL/UL TDD-slot in the same TDD interval. If the DN or CN transmits the ACK in the preceding TX/RX TDD-SP, the DN or CN does not need to participate in ACK transmission during an ACK TDD slot.

FIG. 15 schematically illustrates an operation according to the third signaling method of the present invention.

In FIG. 15, a distribution node (DN) is a node to allocate TDD scheduling and may be a PCP/AP, an AP, or the like, and a client node (CN) is a node to be allocated TDD scheduling by the DN and may be an STA or the like.

In FIG. 15, it is assumed that the DN allocates a TDD-SP (TX), a TDD-SP (RX), a TDD-SP (TX for ACK), and a TDD-SP (RX for ACK) for three CNs (e.g., CN0, CN1, and CN2). More specifically, the DN allocates TDD-SP1 (TX), TDD-SP4 (RX), and TDD-SP6 (RX) to CN0, allocates TDD-SP2 (TX) to CN1, and allocates TDD-SP3 (TX) and TDD-SP 6 (RX) to CN2. Further, the DN allocates TDD-SP7 (TX for ACK) and TDD-SP8 (RX for ACK) to CN0 to CN2.

To do this, the DN may transmit a TDD bitmap schedule IE including {10, 00, 00, 01, 01, 00, 11, 10} to CN0, may transmit a TDD bitmap schedule IE including {00, 10, 00, 00, 00, 00, 11, 10} to CN1, and may transmit a TDD bitmap schedule IE including {00, 00, 10, 00, 00, 01, 11, 10} to CN2.

In this case, CN0, CN1, and CN2 may transmit a UL signal during the respective corresponding slot intervals (and/or receive a DL signal during the respective corresponding slot intervals) and may transmit ACK information during TDD-SP7.

Also, the DN may transmit ACK information to CN0 to CN2 during TDD-SP8. That is, CN0 to CN2 may receive the ACK information from the DN during TDD-SP8.

Hereinafter, a specific method for transmitting and receiving an ACK between an AP and an STA based on TDD allocation based on various types of signaling described above will be described in detail.

First ACK Transmission Method

According to the present invention, an AP and STAs may transmit and receive an ACK in an ACK TDD-SP as follows.

When receiving a signal according to the DL/UL TDD SP order, STAs transmit an ACK (or block-ACK) to a transmitting STA (e.g., AP) in the same order.

When each STA transmits an ACK frame, the IFS between ACK frames may be set to (y)IFS, (z)IFS, SIBIFS, or SIFS.

Here, when receiving the signal in the DL TDD SP or the UL TDD SP, the STA may recognize the order in which the STA receives the signal through a TDD bitmap schedule IE. Since ACK transmission in the ACK TDD SP is performed according to the order of the previously allocated DL/UL TDD SPs, if the IFS between ACK frames is determined, the STAs can recognize the position of an ACK TDD SP for the STAs transmit an ACK among the ACK TDD SPs.

Second ACK Transmission Method

Figure 16:
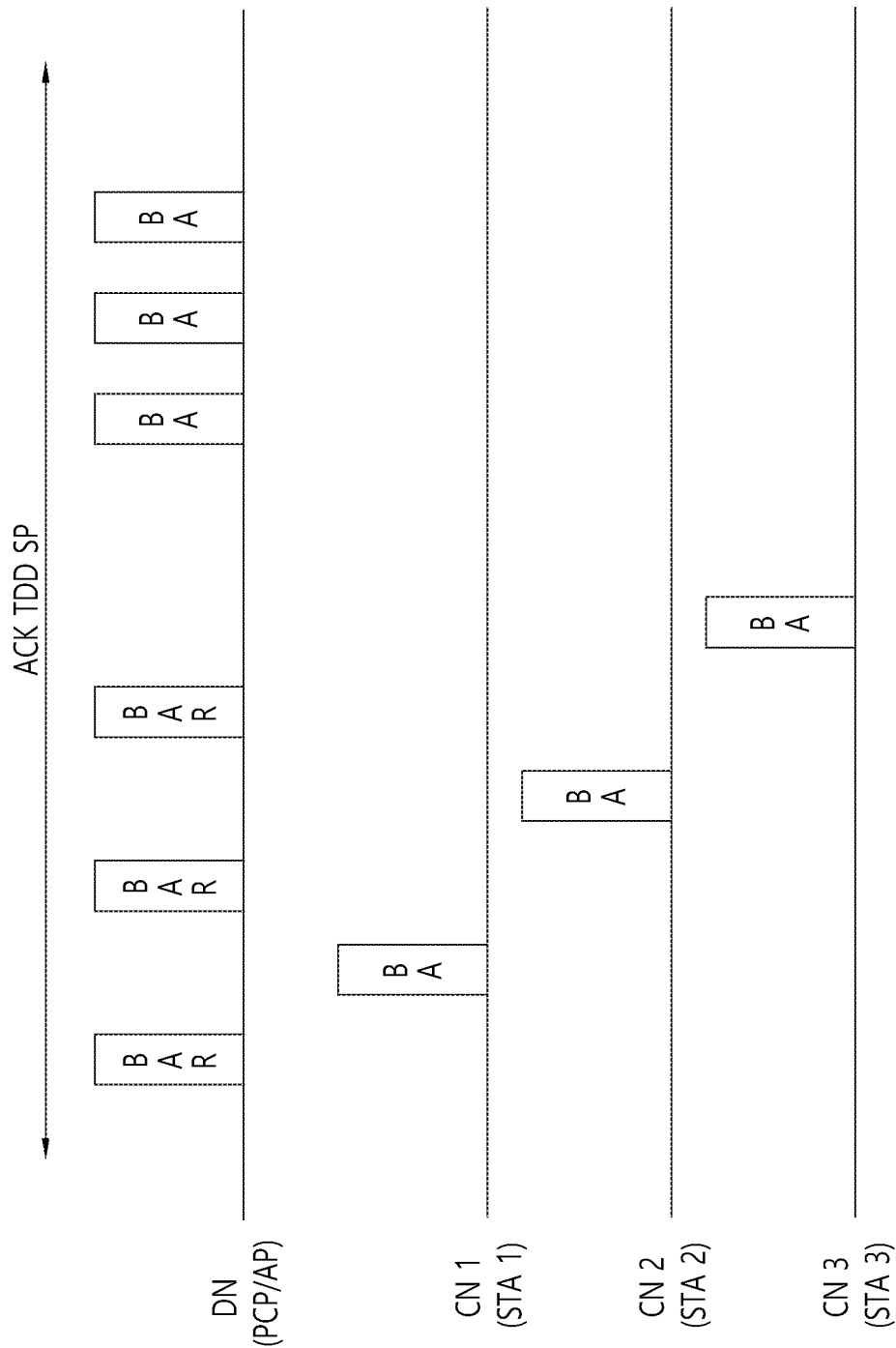
FIG. 16 schematically illustrates an ACK transmission/reception operation between an AP and an STA according to an embodiment of the present invention.

FIG. 16 schematically illustrates an ACK transmission/reception operation between an AP and an STA according to an embodiment of the present invention.

According to the present invention, an AP and STAs may transmit and receive an ACK in an ACK TDD-SP as follows.

First, an operation of transmitting an ACK (STA→AP) of a DL TDD-SP (AP→STA) may be performed based on the following polling method.

In the ACK TDD-SP, the AP transmits a block ACK request (BAR) to the STAs by the polling method.

Upon receiving the BAR, the STAs transmit a BA to the AP to indicate whether the STAs receive a corresponding medium access control (MAC) frame received in a UL TDD-SP.

When a DL TDD-SP and a UL TDD-SP are allocated to a particular STA during a TDD-based SP, the STA can transmit a BA of data received in the UL TDD-SP during the DL TDD-SP. Alternatively, the STA may transmit a BA of data received in the DL TDD-SP during the UL TDD-SP.

However, STAs that are not allocated any of a DL TDD-SP and a UL TDD-SP during a TDD-based SP can transmit a BA using the ACK TDD-SP.

Further, in the ACK TDD-SP, the AP can transmit a BA of the MAC frame received in the UL TDD-SP to the STAs.

Third ACK Transmission Method

As described above in the third signaling method and FIG. 14, a TDD slot for ACK transmission may be configured (or defined) to be divided into an ACK TDD slot for UL transmission and a TDD slot for DL transmission. In this case, an AP and an STA may transmit and receive an ACK as follows.

Figure 17:
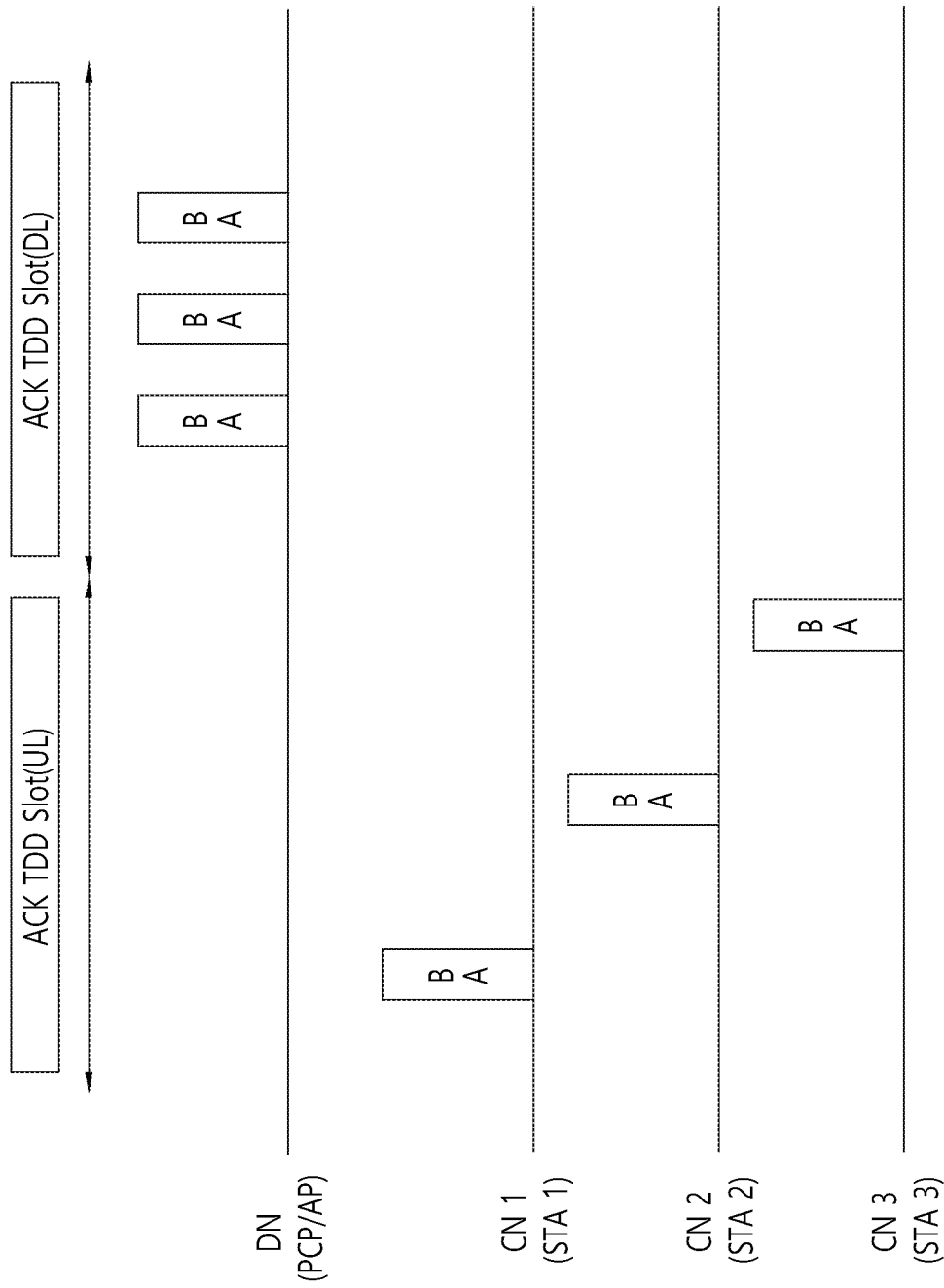
FIG. 17 schematically illustrates an ACK transmission/reception operation between an AP and an STA according to another embodiment of the present invention.

FIG. 17 schematically illustrates an ACK transmission/reception operation between an AP and an STA according to another embodiment of the present invention.

During an ACK TDD-slot (UL), STAs may perform ACK transmission according to the previous TDD-slot order for DL transmission. That is, the order of the ACK transmission may be set according to the TDD-slot order for previous DL transmission.

Here, the duration of the TDD-slot for ACK transmission may be adjusted by a scheduler considering interference management across BSSs.

Conclusion

Figure 18:
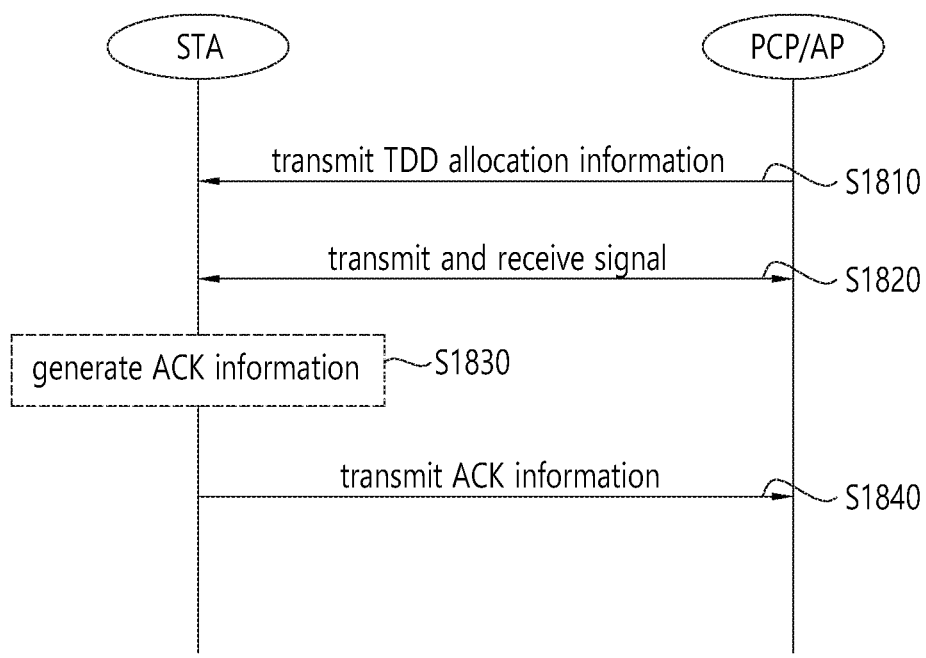
FIG. 18 schematically illustrates an operation of transmitting and receiving ACK information between an STA and an AP according to an embodiment of the present invention.
Figure 19:
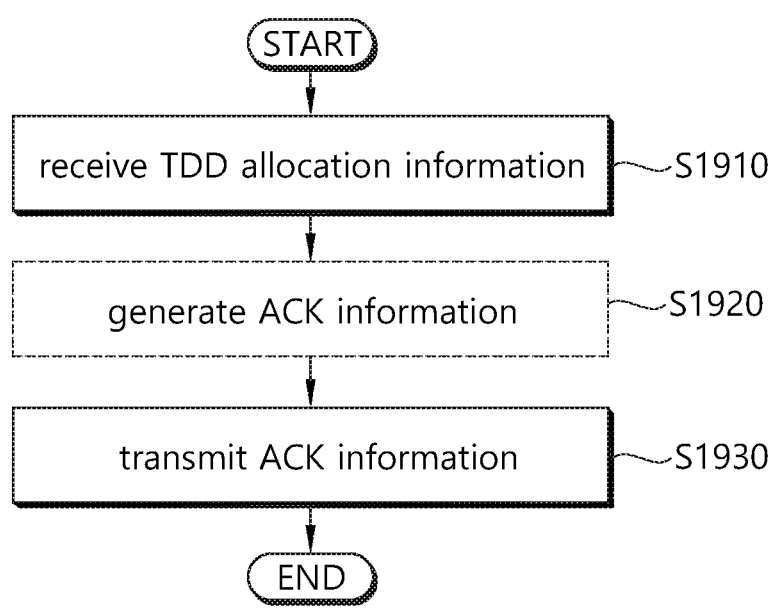
FIG. 19 is a flowchart schematically illustrating an ACK information transmission operation of an STA according to an embodiment of the present invention.
Figure 20:
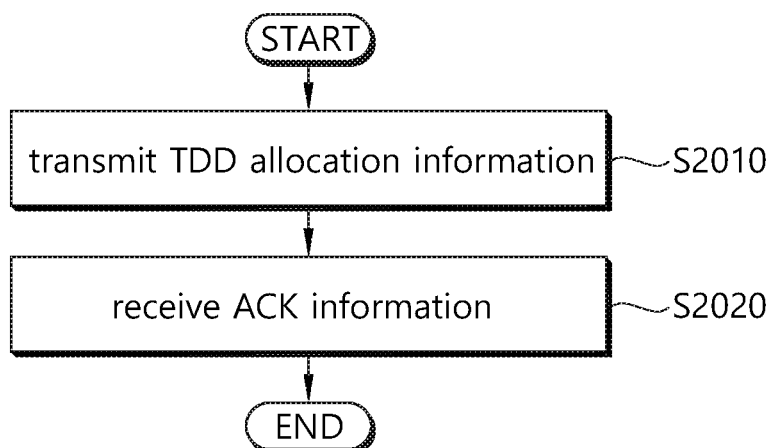
FIG. 20 is a flowchart schematically illustrating an ACK information reception operation of an AP according to an embodiment of the present invention.

FIG. 18 schematically illustrates an operation of transmitting and receiving ACK information between an STA and an AP according to an embodiment of the present invention, FIG. 19 is a flowchart schematically illustrating an ACK information transmission operation of an STA according to an embodiment of the present invention, and FIG. 20 is a flowchart schematically illustrating an ACK information reception operation of an AP according to an embodiment of the present invention.

First, an STA receives TDD allocation information from a PCP/AP (S1810 and S1910). To this end, the PCP/AP transmits the TDD allocation information to the STA (S2010).

In the present invention, the STA and the PCP/AP may transmit/receive a signal (S1820) before transmitting/receiving the ACK information. Here, although FIG. 18 clearly shows the order of the signal transmission/reception operation and the TDD allocation information transmission/reception operation for the convenience of explanation, the transmission/reception operations of the signals can be performed in different orders. For example, the transmission/reception operations of the signals may be performed simultaneously, or the signal transmission/reception operation may be performed before the TDD allocation information transmission/reception operation.

Here, when one SP includes at least one first time unit and one first time unit includes at least one second time unit, the TDD allocation information includes information on all second time units included in the one SP. For example, as illustrated in FIG. 11, when a first time unit corresponds to a TDD slot and a second time unit corresponds to a TDD-SP, the TDD allocation information include information about all TDD-SPs included in the one SP. Alternatively, as illustrated in FIG. 12, when a first time unit corresponds to a TDD interval and a second time unit corresponds to a TDD slot, the TDD allocation information include information about all TDD slots included in the one SP.

Next, the STA may generate ACK information to be subsequently transmitted (S1830 and S1920).

The STA transmits the ACK information to the PCP/AP in at least one second time unit determined based on the TDD allocation information in the one SP (S1840 and S1930). The PCP/AP may receive the ACK information from the STA in the at least one second time unit determined based on the TDD allocation information in the one SP (S2020).

Here, the TDD allocation information may indicate that the at least one second time unit is allocated for transmitting the ACK information.

More specifically, the TDD allocation information may include at least one successive two bits information and each of the two bits information may comprise information on whether a related second time unit is allocated for transmitting the ACK information.

Here, when the number of first time units included in the one SP is Q and the number of second time units included in the one first time unit is M, the TDD allocation information may have a size of octets that satisfies the following equation.

$$\left\lceil \frac{Q \times M}{4} \right\rceil \quad \text{[Equation]}$$

Here, [A] may represent a symbol indicating the smallest integer among integers equal to or greater than A.

A particular second time unit for the STA to transmit the ACK information may be allocated in the last interval of a particular first time unit including the particular second time unit. That is, the PCP/AP may allocate the particular second time unit for receiving the ACK information from the STA in the last interval of a particular first time unit including the particular second time unit.

The STA may receive a signal requesting transmission of the ACK information from the PCP/AP before transmission of the ACK information. Accordingly, the STA may transmit the ACK information to the PCP/AP in a corresponding time interval.

The one SP may be included in a DTI.

3. Device Configuration

Figure 21:
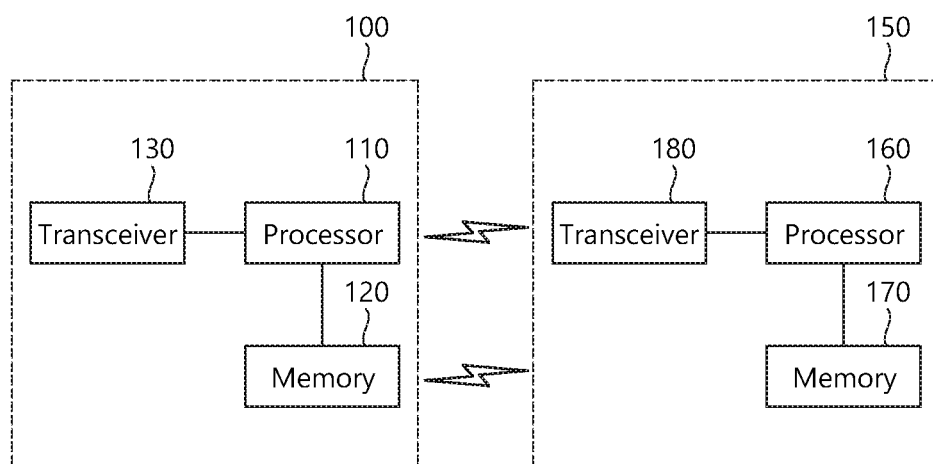
FIG. 21 is a diagram describing a device for implementing the above-described method.

FIG. 21 is a diagram describing a device for implementing the above-described method.

A wireless device 100 in FIG. 21 may correspond to a TDD scheduler (e.g., a PCP/AP, an AP, or a DN) that manages TDD scheduling described above, and a wireless device 150 may correspond to a TDD-scheduled device (e.g., an STA or a CN) that is scheduled by the TDD scheduler.

The transmission device 100 may include a processor 110, a memory 120, and a transceiver 130. The reception device 150 may include a processor 160, a memory 170, and a transceiver 180. The transceivers 130 and 180 may transmit/receive radio signals and may be implemented in a physical layer of IEEE 802.11/3GPP or the like. The processors 110 and 160 may be implemented in the physical layer and/or MAC layer and may be connected to the transceivers 130 and 180.

The processors 110 and 160 and/or the transceivers 130 and 180 may include an application-specific integrated circuit (ASIC), a chipset, a logic circuit, and/or a data processor. The memories 120 and 170 may include read-only memory (ROM), random-access memory (RAM), flash memory, a memory card, a storage medium, and/or other storage units. When an embodiment is executed by software, the methods described above may be executed as a module (e.g., a process or function) that performs the foregoing functions. The module may be stored in the memories 120 and 170 and may be executed by processors 110 and 160. The memories 120 and 170 may be located inside or outside the processors 110 and 160 and may be coupled to the processor 110 and 160 via a well-known means.

More specifically, the transmission device that transmits ACK information may receive TDD allocation information from another station device through the processor 110 controlling the transceiver 130 in one service period (SP) and may transmit ACK information to the other station device in at least one second time unit determined based on the TDD allocation information in the one SP. Here, when the one SP includes at least one first time unit and one first time unit includes at least one second time unit, the TDD allocation information may include information on all second time units included in the one SP.

Also, the reception device that receives ACK information may transmit TDD allocation information to another station device through the processor 160 controlling the transceiver 180 in one SP and may receiving ACK information from the other station device in at least one second time unit determined based on the TDD allocation information in the one SP. Here, when the one SP includes at least one first time unit and one first time unit includes at least one second time unit, the TDD allocation information may include information on all second time units included in the one SP.

As described above, the detailed description of the preferred exemplary embodiment of the present invention is provided so that anyone skilled in the art can implement and execute the present invention. In the detailed description presented herein, although the present invention is described with reference to the preferred exemplary embodiment of the present invention, it will be understood by anyone having ordinary skills in the art that diverse modifications, alterations, and variations can be made in the present invention. Therefore, the scope and spirit of the present invention will not be limited only to the exemplary embodiments of the present invention set forth herein. Thus, it is intended to provide the broadest scope and spirit of the appended claims of the present invention that are equivalent to the disclosed principles and novel characteristics of the present invention.

INDUSTRIAL APPLICABILITY

Although the present invention has been described in detail under the assumption that the present invention can be applied to an IEEE 802.11 based wireless LAN (WLAN) system, the present invention will not be limited only to this. It will be understood that the present invention can be applied to diverse wireless systems capable of performing data transmission based on channel bonding by using the same method as presented herein.

What is claimed is:

1. A method for transmitting, by a station (STA), acknowledgement (ACK) information in a wireless local area network (WLAN) system, the method comprising:
    receiving, from an access point (AP), time division duplex (TDD) allocation information in one service period (SP),
    wherein the one SP comprises at least one first time unit, wherein one first time unit among the at least one first time unit comprises at least one second time unit, and wherein the TDD allocation information comprises allocation information on the at least one second time unit;

receiving, from the AP, downlink (DL) TDD data in the at least one second time unit; and transmitting the ACK information to the AP in a third time unit, wherein the third time unit is determined, based on the TDD allocation information, as an earliest second time unit among the at least one second time unit after receiving the DL TDD data.

2. The method of claim 1, wherein the TDD allocation information comprises information on the at least one second time unit being allocated for transmitting the ACK information.

3. The method of claim 2, wherein the TDD allocation information comprises two bits information, and wherein the two bits information comprises information on whether a second time unit among the at least one second time unit is allocated for transmitting the ACK information.

4. The method of claim 3, wherein when a number of first time units comprised in the one SP is Q and a number of second time units comprised in the one first time unit is M, the TDD allocation information has a size of octets that satisfies an equation below:

$$\left\lceil \frac{Q \times M}{4} \right\rceil, \qquad \text{[Equation]}$$

where $$\left\lceil \frac{Q \times M}{4} \right\rceil$$

is a smallest integer among integers equal to or greater than $$\frac{Q \times M}{4}.$$

5. The method of claim 1, wherein a particular second time unit for the STA to transmit the ACK information is allocated in a last interval of the one first time unit.

6. The method of claim 1, wherein the STA receives, from the AP, a signal requesting transmission of the ACK information before transmission of the ACK information.

7. The method of claim 1, wherein the one SP is comprised in a data transfer interval (DTI).

8. A method for receiving, by an access point (AP), acknowledgement (ACK) information from a station (STA) in a wireless local area network (WLAN) system, the method comprising:

transmitting, to the STA, time division duplex (TDD) allocation information for one service period (SP), wherein the one SP comprises at least one first time unit, wherein one first time unit among the at least one first time unit comprises at least one second time unit, and wherein the TDD allocation information comprises allocation information on the at least one second time unit;

transmitting, to the STA, downlink (DL) TDD data in the at least one second time unit and receiving the ACK information from the STA in a third time unit, wherein the third time unit is determined, based on the TDD allocation information, as an earliest second time unit among the at least one second time unit after receiving the DL TDD data.

9. The method of claim 8, wherein the TDD allocation information comprises information on the at least one second time unit being allocated for transmitting the ACK information.

10. The method of claim 9, wherein the TDD allocation information comprises two bits information, and the two bits information comprises information on whether a second time unit among the at least one second time unit is allocated for transmitting the ACK information.

11. The method of claim 10, wherein when a number of first time units comprised in the one SP is Q and a number of second time units comprised in the one first time unit is M, the TDD allocation information has a size of octets that satisfies an equation below:

$$\left\lceil \frac{Q \times M}{4} \right\rceil, \qquad \text{[Equation]}$$

where $$\left\lceil \frac{Q \times M}{4} \right\rceil$$

is a smallest integer among integers equal to or greater than $$\frac{Q \times M}{4}.$$

12. The method of claim 8, wherein a particular second time unit for the AP to receive the ACK information from the STA is allocated in a last interval of the one first time unit.

13. The method of claim 8, wherein the AP transmits a signal requesting transmission of the ACK information to the STA before reception of the ACK information.

14. The method of claim 8, wherein the one SP is comprised in a data transfer interval (DTI).

15. A station device for transmitting acknowledgement (ACK) information in a wireless local area network (WLAN) system, the station device comprising:

a transceiver configured to have at least one radio frequency (RF) chains and to transmit or receive a signal to and from another station device; and a processor configured to be connected to the transceiver and to process the signal transmitted to or received from the another station device, wherein the processor is configured to:

receive time division duplex (TDD) allocation information from the another station device in one service period (SP), wherein the one SP comprises at least one first time unit, wherein one first time unit among the at least one first time unit comprises at least one second time unit, and wherein the TDD allocation information comprises allocation information on the at least one second time unit; and receive, from the another station device, downlink (DL) TDD data in the at least one second time unit; and transmit the ACK information to the another station device in a third time unit, wherein the third time unit is determined, based on the TDD allocation information, as an earliest second time unit among the at least one second time unit after the DL TDD data is received.

* * * * *